(12) United States Patent
Burry et al.

(10) Patent No.: US 9,261,352 B2
(45) Date of Patent: Feb. 16, 2016

(54) CHROMATIC CONVERTER FOR ALTIMETRY

(71) Applicant: Unitechnologies SA, Gals (CH)

(72) Inventors: Jean-Michel Burry, Montreal la Cluse (FR); Leon Berger, Neuchatel (CH)

(73) Assignee: Unitechnologies SA, Gals (CH)

( * ) Notice: Subject to any disclaimer, the term of this patent is extended or adjusted under 35 U.S.C. 154(b) by 0 days.

(21) Appl. No.: 14/402,602

(22) PCT Filed: May 21, 2013

(86) PCT No.: PCT/EP2013/060434
§ 371 (c)(1),
(2) Date: Nov. 20, 2014

(87) PCT Pub. No.: WO2013/174826
PCT Pub. Date: Nov. 28, 2013

(65) Prior Publication Data
US 2015/0131137 A1    May 14, 2015

(30) Foreign Application Priority Data
May 21, 2012  (EP) .................................... 12168774

(51) Int. Cl.
*G02B 26/02* (2006.01)
*G01B 11/06* (2006.01)
*G01B 11/25* (2006.01)
(Continued)

(52) U.S. Cl.
CPC ........ *G01B 11/0608* (2013.01); *G01B 11/2509* (2013.01); *G01C 5/00* (2013.01); *G02B 13/22* (2013.01); *G02B 19/0028* (2013.01); *G02B 19/0076* (2013.01); *G02B 26/02* (2013.01); *G02B 27/14* (2013.01); *G02B 27/30* (2013.01)

(58) Field of Classification Search
CPC ............... G02B 13/22; G02B 19/0028; G02B 19/0076; G02B 26/02; G02B 27/14; G02B 27/30; G01B 11/0608; G01C 5/00
USPC ....................................................... 359/235
See application file for complete search history.

(56) References Cited

U.S. PATENT DOCUMENTS

| | | |
|---|---|---|
| 3,674,334 A | 7/1972 | Offner |
| 2008/0259354 A1 | 10/2008 | Gharib et al. |
| 2009/0091723 A1 | 4/2009 | Sasaki |

FOREIGN PATENT DOCUMENTS

| | | |
|---|---|---|
| EP | 0950168 B1 | 8/2005 |
| FR | 2707018 A1 | 12/1994 |
| FR | 2950441 A1 | 3/2011 |

*Primary Examiner* — James Phan
(74) *Attorney, Agent, or Firm* — The Webb Law Firm

(57) ABSTRACT

A chromatic converter for altimetry is disclosed which is intended to produce a real image of a predefined observation zone of a sample surface that is representative of the local height of this sample. This chromatic converter comprises: a device for illuminating the sample comprising a source of polychromatic light and arranged to cover all of the observation zone by means of N incident beams defining object points of the sample, an Offner autocollimator comprising a Mangin mirror for introducing axial chromatism into each of the N incident beams before they arrive at the sample surface to be reflected as N respective reflected beams, N filtering holes associated with the N respective reflected beams to convert them into filtered beams of low spectral width, intended to form image spots constituting the real image, and at least one polarization device making it possible to polarize the N incident beams and the N reflected beams.

20 Claims, 3 Drawing Sheets

(51) Int. Cl.
*G01C 5/00* (2006.01)
*G02B 13/22* (2006.01)
*G02B 19/00* (2006.01)
*G02B 27/14* (2006.01)
*G02B 27/30* (2006.01)

CHROMATIC CONVERTER FOR ALTIMETRY

CROSS-REFERENCE TO RELATED APPLICATIONS

This application is the United States national phase of International Application No. PCT/EP2013/060434 filed May 21, 2013, and claims priority to European Patent Application No. 12168774.3 filed May 21, 2012, the disclosures of which are hereby incorporated in their entirety by reference.

BACKGROUND OF THE INVENTION

1. Field of the Invention

The present invention relates to the field of the three-dimensional digitization, in real time and without contact, of objects industrially manufactured or designed in research laboratories, and relates in particular to the so-called "chromatic confocal" optical apparatuses.

More specifically, the invention relates to a chromatic converter for altimetry which generates a real image of the measurement field containing a sample, by converting the local height of its surface into wavelength.

The device comprises a polychromatic light source and an optical device intended to transform the light emitted by the source into numerous parallel polarized beams provided with essentially axial chromatism. The reflection of these beams on the sample to be studied is then analyzed by an analysis device in order to know the local height of the surface of the sample.

2. Description of Related Art

Devices that make it possible to know the height of a surface have already been disclosed, for example in the patent EP 0950168B1. The apparatus described digitizes slices of the surface of a sample, then performs a three-dimensional reconstruction of the surface using computer means. For this, the sample is lit by a chromatic beam, and placed on a plate that can be moved horizontally along x and y axes. For a given y position, the apparatus measures the wavelength reflected by the surface for a series of x coordinates, which makes it possible to deduce there from the height z of the sample by virtue of the chromatic coding.

The major drawback of this analysis technique lies in the time it takes to digitize an image, which is very long. This is due to two factors: (i) the measurement which is performed point-by-point, and (ii) the plate which has to be moved during acquisitions.

The chromatic confocal device presented in the patent application FR 2950441A1 makes it possible to measure the height of a surface more quickly.

For this, a number of independent measurement pathways simultaneously determine the height of a number of points of the surface, such that a fraction of the observation zone is probed at one time.

More specifically, each beam reflected by a point of the surface is scattered by a spectral analysis device, in such a way that each spectrum obtained occupies all or part of a row of pixels of a photodetector. The number of points of the surface that can be analyzed simultaneously is therefore limited.

As an example, the holder of this patent specifies that the device makes it possible to divide up a 2048-pixel photoelectric detector between 10 measurement pathways.

To obtain the entire measurement of the observation zone, an internal scanning device is added to the apparatus. This device consists, for example, of a rotating mirror which deflects the beams from the measurement pathways to different points of the surface of the sample to be studied. By virtue of the internal scanning device, the acquisitions are performed without moving the sample.

This internal scanning method in a confocal device makes it possible to enhance the speed of acquisition of the measurements, but insufficiently.

Furthermore, the fact that each measurement pathway is independent creates a significant increase in the cost of the apparatus, because the optical elements and the spectral analysis devices are multiplied.

Moreover, the juxtaposing of the measurement pathways notably increases the size of the machine. To limit this drawback, the apparatus is divided up into two blocks linked by optical fibers in order to have a measurement head of reasonable dimensions, but this does nothing to resolve the problem linked to the overall bulk of the device.

It appears from the above that the current systems are ill-suited to industrial constraints, whether in terms of cost, bulk, and above all in terms of speed of analysis of the samples studied.

The patent application FR 2707018 A1 discloses an enhanced three-dimensional digitization device that makes it possible to cover an extended observation zone rapidly. More specifically, this device comprises a disk pierced with a multitude of holes and driven in rotation to create and displace secondary light sources, from a single light source, in order to scan all of the observation zone.

SUMMARY OF THE INVENTION

Disclosed herein is an alternative construction to that of the chromatic confocal devices known from the prior art. More specifically, disclosed herein is a chromatic converter for altimetry which makes it possible to produce a real and complete image of a predefined observation zone of the surface of a sample representative of the local height of that sample.

To that end, the chromatic converter for altimetry according to the invention may comprise:

a device for illuminating the sample comprising at least one polychromatic light source and, arranged in such a way as to cover, at each instant, all of the predefined observation zone, a mask comprising a plurality of transmission members and making it possible to simultaneously generate N incident beams from said polychromatic light, each incident beam defining an object point of the sample, the mask being arranged in such a way that it blocks a portion of the polychromatic light to allow only the N incident beams to pass, the latter being distributed substantially throughout the extent of said observation zone, an optical device intended to introduce axial chromatism into each of said N incident beams, according to a given range of wavelengths, before the N incident beams arrive at the sample surface to be reflected as N respective reflected beams by the corresponding object points, a filtering device having a plurality of filtering holes, N filtering holes being associated with the N respective reflected beams to convert them into filtered beams of low spectral width, intended to form image spots constituting said real image, wherein the converter may comprise at least one polarization device making it possible to polarize the N incident beams and the N reflected beams, and wherein the optical device intended to introduce axial chromatism is an Offner autocollimator comprising at least one Mangin mirror.

An Offner autocollimator is, for example, described in the patent U.S. Pat. No. 3,674,334.

An Offner autocollimator is an optical system that is particularly interesting in that it acts as a lens while being more compact and less costly. Moreover, this type of system does not introduce aberrations to the third order.

Moreover, the mask may advantageously be movably mounted to modify the position of the object points over time, so that the object points scan substantially all of the observation zone.

According to one embodiment of the invention, the mask may substantially be in the form of a disk, and may comprise at least one segment comprising the transmission members, whereas an additional mask, of geometry similar to that of the first mask, may comprise at least one segment comprising the filtering holes of the filtering device. In this embodiment, the two masks may be driven in rotation at the same speed, by means of a driving member, and may be arranged in such a way that, at each instant, a filtering hole of the additional mask may be associated with one beam of the N beams reflected by an object point of the surface of the sample.

According to another advantageous embodiment, the mask may substantially be in the form of a disk, and may bear the filtering device, in such a way as to generate the N incident beams by means of the transmission members, and to filter the N reflected beams by means of the filtering holes. Here, the transmission members and the filtering holes may be arranged in such a way that, at each instant, a filtering hole of the mask may be associated with one of the N beams reflected by an object point of the surface of the sample.

According to a preferred embodiment, the mask may comprise an even number of segments, each segment comprising transmission members being associated with a segment comprising filtering holes, which is diametrically opposite thereto.

Moreover, the mask or masks may advantageously comprise neutral zones blocking the passage of the polychromatic light.

Preferentially, the transmission members may comprise holes, called source holes, of a greater diameter than the filtering holes.

According to a preferred embodiment, the N incident beams may also be filtered by means of N filtering holes to be converted into spatially uniform beams, before arriving at the surface of the sample.

In this way, the filtering holes make it possible to both maximize the signal-to-noise ratio of the incident beams, and to limit the range of wavelengths of the beams reflected by the surface.

Furthermore, the chromatic converter for altimetry according to the invention may comprise a light-splitting device, intended to split the light fluxes of the N incident beams and of the N reflected beams, to allow almost all of the light flux of the former to propagate toward said surface of the sample and almost all of the light flux of the latter to propagate toward an analysis device comprising a camera, the analysis device being arranged to convert a wavelength into a local height of the corresponding object point of the surface of the sample.

Advantageously, the polychromatic light source may light the mask sequentially. In this way, the spectral analysis device may acquire only data that is relevant for the analysis of the sample.

The camera may preferably be chosen from a trichromatic camera or a complementary color camera. Advantageously, the sensor of the camera may be a CCD, tri-CCD, CMOS or multiple CMOS sensor.

Preferentially, the chromatic converter for altimetry according to the invention may comprise a second Offner autocollimator, of which one of the two mirrors is a Mangin mirror, the Offner autocollimator being arranged upstream of the device intended to introduce axial chromatism, to correct the chromatic defects generated by the light-splitting device.

Alternatively, the optical device intended to correct the chromatic defects of the incident beams may also be a conventional lens.

According to another aspect of the invention, the chromatic converter for altimetry may be mounted on a telecentric, preferably bi-telecentric, lens, to be able to adapt the measurement field to the size of the object to be observed.

All the beams from a telecentric or bi-telecentric lens offer the advantage of being parallel to the optical axis. On the other hand, depending on its quality, this type of lens can generate chromatism on the edges of the observation zone, but a simple calibration prior to the measurements makes it possible to remedy this. For this, a reference sample can be used, in order to determine the correlation between the wavelength of the reflected beams and the height of the corresponding object points.

Moreover, the depth of field of a telecentric or bi-telecentric lens used with chromatic beams is much wider than with white beams.

By virtue of this particularly advantageous feature, the chromatic converter for altimetry may not only be used to measure the height of the surface of a sample, but also to measure distances between different points of the sample, since all of the observation zone is clear.

Because of this, the apparatus is very well suited to use in the watch-making industry for examining, for example, the finishes of watch middles, or in the aeronautical industry for inspecting compressor fins.

Finally, the present invention relates to the method for producing an image of the observation zone of the surface of a sample using a chromatic converter for altimetry according to the invention.

BRIEF DESCRIPTION OF THE DRAWINGS

Other features and advantages of the present invention will become more clearly apparent on reading the following detailed description of a preferred embodiment, given with reference to the attached drawings that are given as non-limiting examples and in which.

EMBODIMENT(S) OF THE INVENTION

Figure 1A:
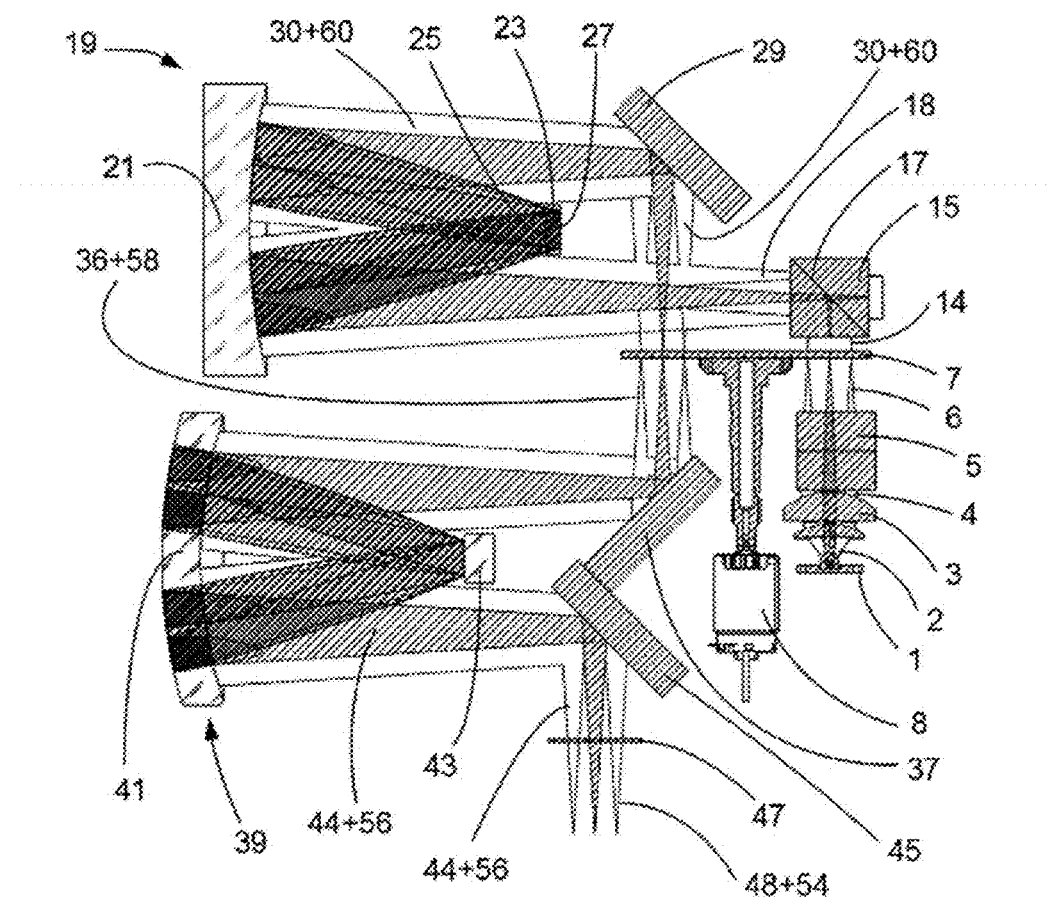
FIG. 1a represents a simplified front view of a chromatic converter for altimetry according to a first embodiment.
Figure 1B:
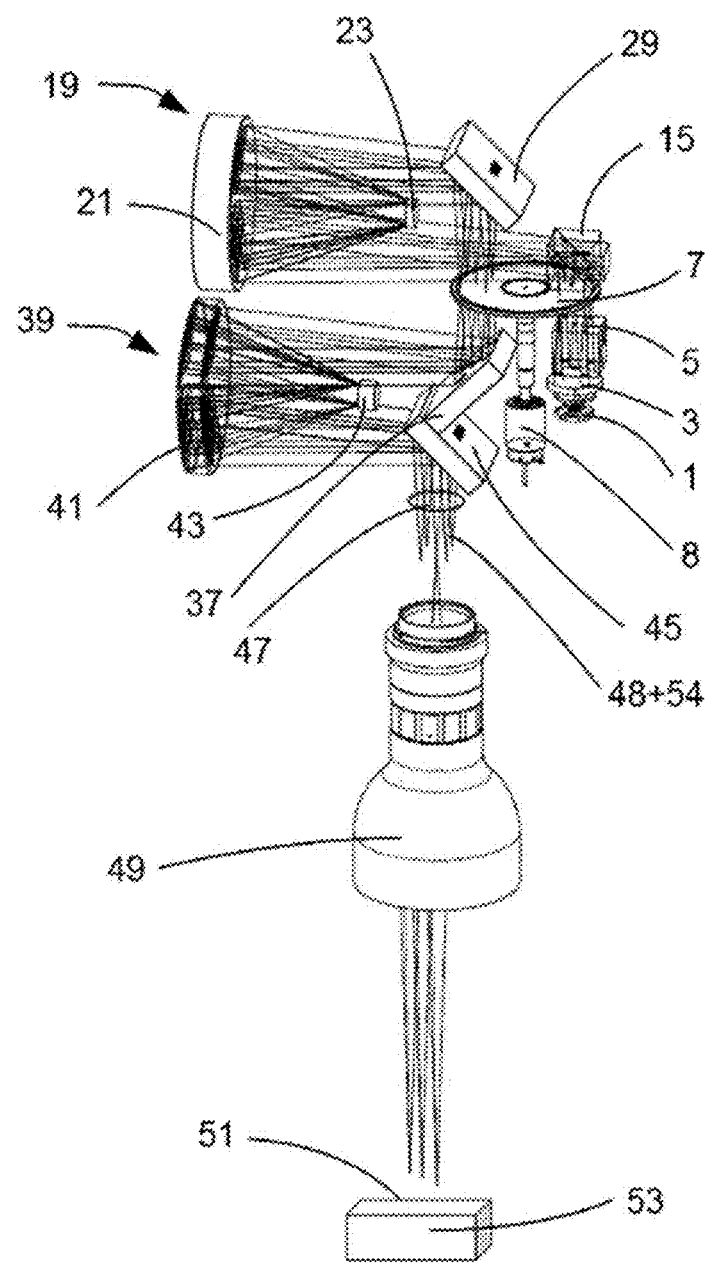
FIG. 1b represents a simplified perspective view of a chromatic converter for altimetry mounted on a telecentric lens.
Figure 2:
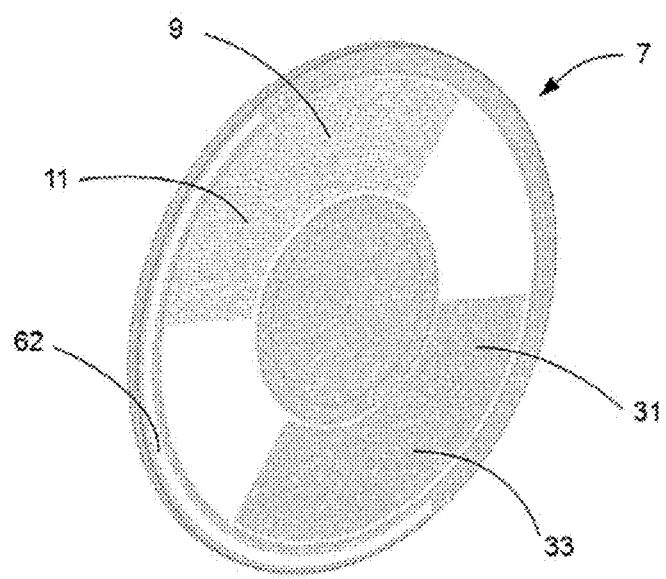
FIG. 2 represents a simplified front view of the mask according to the first embodiment of the invention.

According to a first embodiment illustrated by FIGS. 1a, 1b and 2, a light source 1, for example a white LED, emits a non-polarized polychromatic light beam 2, which passes through a set of lenses 3. The latter act as condenser and are intended to make the intensity of the light beam uniform. At the output of the lenses 3, the beam 4 is substantially uniform and parallel, and measures a few centimeters in diameter.

The optical system used to obtain a parallel and uniform beam is a conventional device used in the apparatuses such as microscopes. A person skilled in the art can easily adapt it to his or her needs without departing from the framework of the invention.

The beam 4 then passes through a polarizing cube 5 and adopts a rectilinear polarization, then reaches a mask 7 driven in rotation by a motor 8. More specifically, the polarized beam 6 arrives on the rotating mask 7 in a segment 9 and lights N holes simultaneously. These holes are called source holes 11, and are, for example, arranged as portions of concentric spirals.

The holes are qualified as source holes because they are considered as so many spot sources of rectilinearly polarized polychromatic light. The light passing through the holes is diffracted and the section of each incident beam exhibits a central disk and increasingly attenuated concentric circles.

Moreover, the source holes 11 have a diameter of the order of a few tens of microns, preferentially thirty or so microns, for an optical system aperture of f/8.

Furthermore, the distance separating two neighbouring holes 11 is of the order of 15 to 50 times greater than the diameter of the source holes. In this way, the incident beams do not interfere with one another.

It will also be noted that the motor 8 drives the mask 7 at a rotation frequency of the order of a few tens of Hertz, even a hundred or so Hertz. This frequency is advantageously linked to the data acquisition frequency, as will be explained below.

Moreover, it is important to note that, given that the mask 7 is rotationally mobile, the N source holes 11 lit by the beam 4 are different at each instant, such that the position of the N object points lit by the N incident beams 14 changes over time.

At the mask output, the N incident beams 14, rectilinearly polarized and divergent, reach a polarizing splitter cube 15 with a dichroic beam splitter 17. The cube 15 is arranged in the optical set-up in such a way that the beams reach the splitter 17 with an angle of incidence of 45°.

Conventionally, such a cube is provided to reflect almost all of the light flux of a polarized beam along a predefined polarization axis (polarization P), and to transmit almost all of the light flux of a perpendicularly polarized beam (polarization S). Here, the cube 15 reflects almost all of the light flux of the incident beams 14, and transmits almost all of the light flux of the reflected beams, as will be seen hereinbelow.

Generally, a dichroic beam splitter introduces chromatic defects. The result of this is that the beams 18 reflected by the splitter 17 are no longer perfectly white beams.

To resolve this problem, a modified Offner autocollimator 19 is placed in the optical set-up.

The latter consists of a main spherical mirror 21 and a secondary mirror 23, also spherical. Conventionally, the mirror 21 is silvered on its front face, that is to say on the concave face. On the other hand, the mirror 23 is a Mangin mirror, and therefore has the particular feature of being silvered on its rear face. In the case in point, its reflecting face is not its hyperbolic face 25 but its planar face 27.

The use of a Mangin mirror as secondary mirror makes it possible to correct the chromatism introduced by the dichroic beam splitter, such that, at the output of the Offner autocollimator, the incident beams are white beams.

As in all the Offner autocollimators, the set-up is afocal, that is to say that the secondary mirror 23 coincides with the focus of the main mirror 21. In this way, all the beams parallel to the optical axis of the main mirror 21 are directed toward the secondary mirror 23.

With respect to the invention, the incident beams 18, polarized, slightly chromatic and divergent, are reflected a first time on the main mirror 21 toward the secondary mirror 23. The latter returns the incident beams toward the main mirror 21, which returns them toward a planar mirror 29, placed in such a way that the axes of the beams have an angle of incidence of 45°. The mirror 29 then reflects the polarized, white and convergent incident beams 30 toward the mask 7.

Conventionally, the mirrors 21 and 23 are arranged in such a way that the enlargement of the Offner autocollimator 19 is equal to −1. Consequently, each beam arrives on the mask 7, at a point diametrically opposite the source hole 11 from which it originates.

Moreover, the positions of the Offner autocollimator 19 and of the planar mirror 29 are studied so that the distance traveled by the light between the source holes 11 of the mask 7 and the secondary mirror 23, when the incident beams are divergent, is identical to that traveled between the secondary mirror 23 and the mask 7, when the incident beams are convergent. In this way, the image of the source holes is contained in the plane of the mask 7.

After having been reflected on the mirror 29, the incident beams 30 arrive on the mask 7, more specifically on a segment 31 comprising holes, called filtering holes 33, arranged as portions of concentric spirals. Each filtering hole 33 is diametrically opposite a source hole 11, such that the light from a source hole passes back into the filtering hole which is associated with it.

The filtering holes 33 have a smaller diameter than that of the source holes 11. The diameter is chosen to be substantially equal to the diameter of the Airy spot of a beam lighting a source hole of the mask, which would be monochromatic, and the wavelength of which would correspond to the mean wavelength of the light source. In this embodiment, this corresponds to a diameter of the order of 7 to 10 μm.

By virtue of the filtering holes 33, the concentric circles situated at the periphery of the incident beams 30 are stopped by the mask. Consequently, the signal-to-noise ratio increases, which makes it possible to enhance the accuracy of the measurements.

At the output of the mask 7, the polarized and filtered incident beams 36 become divergent again with an optical system aperture that is identical to the starting aperture, that is to say f/8.

The latter arrive on a planar mirror 37 with an angle of incidence of 45° relative thereto. The incident beams 36 are reflected toward a second Offner autocollimator 39 comprising a main Mangin mirror 41, and a secondary mirror 43.

The main mirror 41 has the specific feature of being very thick, to introduce axial chromatism over an extended range of wavelengths. Thus, the white incident beams 36 become chromatic beams after having passed through the Offner autocollimator.

At the output of this second Offner autocollimator, the incident beams 44 are reflected by a planar mirror 45 inclined at 45° and then pass through an achromatic quarter-wave plate 47.

The achromatic quarter-wave plate 47 causes the rectilinear polarization of the incident beams 44 to be transformed into circular polarization, without introducing additional chromatism.

The assembly of the chromatic converter for altimetry is mounted on a lens 49. The latter can be a telecentric or bi-telecentric lens. The choice of the lens depends on the size of the object to be analyzed. The larger the object, the wider the measurement field has to be, and therefore the greater the enlargement of the lens has to be. The lenses 62-902, 62-912 and 62-922 of the Edmund Optics brand, or S5LPJ7208 or S5LPJ1555 from the Silloptics brand are typically lenses that can be used in association with the chromatic converter for altimetry according to the invention.

It will be noted that the lens 49 sees its depth of field increase significantly. For a theoretical depth of field of the order of 2 µm, the latter can reach around one hundred microns with the chromatic beams such as those generated by the chromatic converter for altimetry according to the invention.

The incident beams 48, chromatic and circularly polarized, therefore pass through the lens 49 and then are reflected on the surface 51 of a sample 53, placed in the measurement field of the apparatus.

In accordance with the principle of conventional chromatic confocals, the incident beams 48 converge according to an extended depth of field, each wavelength of the beam converging at an altitude that is specific to it.

By virtue of this specific feature, each reflected beam 54 comprises a very bright, monochromatic, central part, the width of which is less than or equal to that of the filtering hole, and a polychromatic halo which surrounds the central part.

It is important to note that, if the incident beams 48 have a left circular polarization, the reflected beams 54 have a right circular polarization, and vice-versa. In this way, the incident 48 and reflected 54 beams do not interfere with one another.

Consequently, when the reflected beams 54 pass through the quarter-wave plate 47, their circular polarization is transformed into rectilinear polarization. Their polarization axis is orthogonal to the polarization axis of the incident beams 48, such that they still do not interfere with one another.

The reflected beams 56, rectilinearly polarized, then pass through the Offner autocollimator 39, which introduces an additional, previously gauged, chromatism.

On arriving at the filtering holes 33 of the mask 7, each reflected beam 58 is filtered. Only the component of the beam whose wavelength converges in the plane of the mask 7 can pass through the hole, that is to say the very bright central part. The polychromatic halo is almost completely filtered by the wall of the mask. The result thereof is that the spectral width of each reflected beam 60 is extremely small.

The reflected beams 60, quasi-monochromatic and rectilinearly polarized, then pass through the modified Offner autocollimator 19, followed by the polarizing cube 15, so that their spectral distributions remain unchanged. In effect, as has been previously specified, the modified Offner autocollimator 19 is designed to cancel the chromatic defects generated by the polarizing cube 15.

Moreover, almost all of the light flux arriving at the polarizing cube 15 is transmitted toward a spectral analysis device. Only an infinitesimal part of the intensity is reflected to the mask 7. This is due to the fact that the cube reflects the waves polarized on one axis, and transmits those polarized on an orthogonal axis.

The spectral analysis device (not represented) comprises a camera, for example, a complementary color camera, such as the Basler Ace GigE acA750-30gc industrial camera, or a trichromatic camera such as the Basler Ace GigE acA2500-14gc or Foveon X3 Pro 10M CMOS Direct Image Sensor industrial camera.

These trichromatic cameras notably exhibit the particular feature of being sensitive in the red and the blue around a wavelength of 550 nm, which makes it possible to increase the quality of the measurements.

Figure 3:
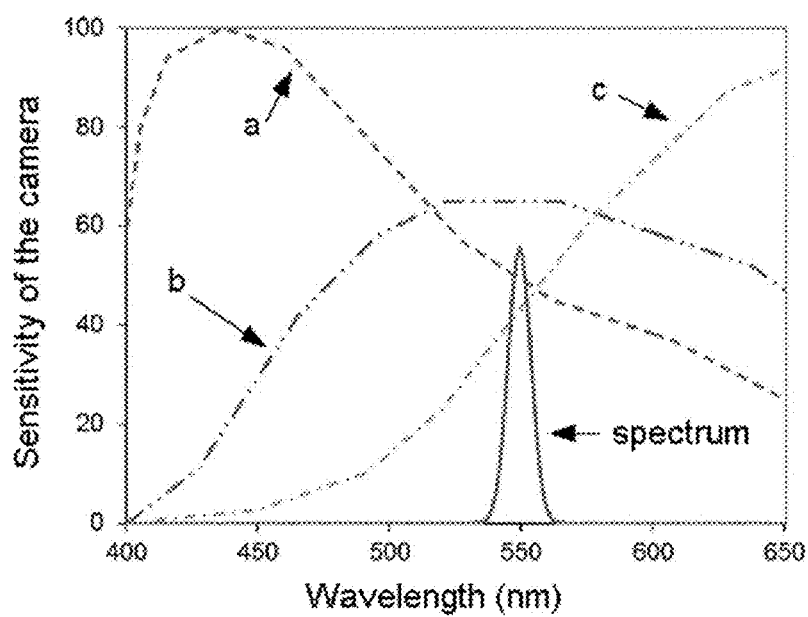
FIG. 3 represents an example of spectral sensitivity of a camera of the spectral analysis device according to the invention, and an example of spectral peak typically received by a pixel of the camera.

To this end, FIG. 3 represents the spectral resolution of this type of camera. The curve denoted with the letter a corresponds to the sensitivity of the camera in the blue, the curve denoted by the letter b represents the sensitivity in the red, and finally the curve denoted by the letter c shows the sensitivity in the green.

The typical resolution of the cameras used is of the order of a few megapixels, more specifically from 4 to 5 megapixels, for a photosensitive surface area measured in tens of millimeters, typically 20 mm×14 mm. In this way, in this first embodiment, the size of the pixels of the camera is substantially equal to the pulse response of the optical system, that is to say the size of the filtering holes 33.

Given the characteristic values of the type of camera used, as well as the characteristic values of the filtering holes (8 µm in diameter), and the distance separating two filtering holes (15 times the diameter of a hole=120 µm), it will be noted that approximately 20000 image spots simultaneously light the photosensitive surface area of the camera.

Moreover, the choice of the resolution of the camera is an important factor for the analysis of the surface 51 of the sample 53. As far as is possible, the chromatic converter for altimetry is arranged so that, during the acquisition of an image, each pixel of the camera receives the light intensity of at least one reflected beam.

It will be noted that, if the camera has a resolution greater than the total number of reflected secondary beams, the chromatic information is then averaged over each area of pixels of the sensor of the camera, which is lit by one and the same reflected beam.

It is also important to stress that, in this embodiment, the source holes 11 and the filtering holes 33 are not present over all the surface area of the mask 7, and therefore the data acquired by the spectral analysis device are not all relevant.

Here, the rotating mask comprises source holes 11 distributed over a surface of the mask of the order of 25%, and filtering holes also distributed over a surface of the order of 25%. One possibility among others is therefore to light the mask sequentially, for example by introducing a shutter (not represented) in front of the light source 1, when the latter is not lighting the segment 9 over which the source holes 11 are distributed.

Alternatively, it is also possible to choose to control the light source 1 in such a way that it is off when it is not lighting the source holes 11.

A device for controlling the sequential lighting of the mask comprises, for example, a laser (not represented) placed upstream of the mask in proximity to the light source, and a sensor (not represented) placed downstream of the mask 7. The beam passes periodically through a semi-circular void 62 of the mask, such that the light intensity received by the sensor makes it possible to know the instant at which the shutter has to be placed in front of the light source 1, or the instant at which the latter has to be on or off.

Such a device for controlling a shutter or a light source is conventional and a person skilled in the art will easily be able to adapt it to his or her requirements.

Moreover, during the acquisition of the images by the camera, the mask 7 performs a certain number of complete revolutions. Thus, the greater the number of revolutions, the higher the light intensity received by the pixels of the camera.

Alternatively, given the geometry of the rotating mask 7, another acquisition method can consist in choosing the rotational frequency of the mask such that it is four times lower than that of the camera. In this way, the spectral analysis device is configured to take into account only one image acquired out of four, that is to say only the images formed by the reflected beams from the filtering holes.

Another processing method can consist in acquiring images sequentially.

For example, for a camera acquisition frequency of 100 Hz and a mask rotation frequency of 25 Hz, an image can be acquired in 10 ms every 40 MS.

Finally, each pixel of the camera receives a spectral information item in the form of a spike as shown in FIG. 3. Knowing the wavelength of the maximum of the spectral spike it is possible to deduce therefrom the local height of the surface 51, in each zone lit by an incident beam, and reconstruct the topography of the sample 53.

The purpose of the above description is to describe a particular embodiment by way of a non-limiting illustration, and the invention is not limited to certain particular features which have just been described. Numerous other embodiments could be envisaged without departing from the scope of the invention.

Notably, the means presented for polarizing and splitting the incident beam are non-limiting and a person skilled in the art will have no particular difficulty in adapting them according to his or her specific needs.

The splitter cube can in particular be used to transmit almost all of the light flux of the incident beams, and reflect almost all of the light flux of the reflected beams.

Furthermore, to obtain usable data, the sequential lighting of the mask can be replaced by a configuration of the spectral analysis device that makes it possible to select the acquired images, or to acquire images sequentially.

The invention claimed is:

1. A chromatic converter for altimetry intended to produce a real and complete image of a predefined observation zone of a sample surface that is representative of the local height of this sample, the chromatic converter comprising:
   a device for illuminating the sample comprising at least one source of polychromatic light and, arranged in such a way as to cover, at each instant, all of said predefined observation zone,
   a mask comprising a plurality of transmission members and making it possible to simultaneously generate N incident beams from said polychromatic light, each incident beam defining an object point of said sample, said mask being arranged in such a way that it blocks a portion of said polychromatic light to allow only said N incident beams to pass, said incident beams being distributed substantially throughout the extent of said observation zone,
   an optical device, intended to introduce axial chromatism into each of said N incident beams, according to a given range of wavelengths, before said N incident beams arrive at the sample surface to be reflected as N respective reflected beams by said corresponding object points,
   a filtering device having at least N filtering holes associated with said N respective reflected beams to convert them into filtered beams of low spectral width, intended to form image spots constituting said real image, and
   at least one polarization device making it possible to polarize said N incident beams and said N reflected beams,
   wherein said optical device intended to introduce axial chromatism is an Offner autocollimator comprising at least one Mangin mirror.

2. The chromatic converter for altimetry as claimed of claim 1, wherein said mask is movably mounted to modify the position of said object points over time, so that said object points scan substantially all of the observation zone.

3. The chromatic converter for altimetry of claim 2, wherein said mask is substantially in the form of a disk, and also bears said filtering device, wherein said transmission members and said filtering holes are arranged relative to one another in such a way that, at each instant, a filtering hole of said mask is associated with one of said N beams reflected by an object point of said surface of said sample.

4. The chromatic converter for altimetry of claim 3, wherein said mask comprises an even number of segments, each segment comprising transmission members being associated with a segment comprising filtering holes, which is diametrically opposite thereto.

5. The chromatic converter for altimetry of claim 1, wherein:
   said mask is substantially in the form of a disk, and comprises at least one segment comprising said transmission members, and
   wherein an additional mask, of geometry similar to that of the said mask, comprises at least one segment comprising said filtering holes of said filtering device,
   said mask and said additional mask being driven in rotation at the same speed, by means of a driving member, and arranged in such a way that, at each instant, a filtering hole of said additional mask is associated with one of said N beams reflected by an object point of said surface of said sample.

6. The chromatic converter for altimetry claim 1, wherein said mask is substantially in the form of a disk, and also bears said filtering device,
   wherein said transmission members and said filtering holes are arranged relative to one another in such a way that, at each instant, a filtering hole of said mask is associated with one of said N beams reflected by an object point of said surface of said sample.

7. The chromatic converter for altimetry of claim 6, wherein said mask comprises an even number of segments, each segment comprising transmission members being associated with a segment comprising filtering holes, which is diametrically opposite thereto.

8. The chromatic converter for altimetry of claim 6, wherein said transmission members comprise holes, called source holes, of a greater diameter than said filtering holes.

9. The chromatic converter for altimetry of claim 8, wherein said N incident beams are also filtered by said filtering holes to be converted into spatially uniform beams, before arriving at the surface of said sample.

10. The chromatic converter for altimetry of claim 6, further comprising a light-splitting device, intended to split the light fluxes of said N incident beams and of said N reflected beams, to allow almost all of the light flux of said N incident beams to propagate toward said surface of the sample and almost all of the light flux of said N reflected beams to propagate toward an analysis device comprising a camera, said analysis device being arranged to convert a wavelength into a local height of the corresponding object point of the surface of the sample.

11. The chromatic converter for altimetry of claim 10, wherein a second Offner autocollimator of which one of the two mirrors is a Mangin mirror is arranged upstream of said device intended to introduce axial chromatism, to correct the chromatic defects generated by said light-splitting device.

12. The chromatic converter for altimetry of claim 1, wherein said mask or masks comprises/comprise neutral zones blocking the passage of said polychromatic light.

13. The chromatic converter for altimetry of claim 1, wherein said transmission members comprise holes, called source holes, of a greater diameter than said filtering holes.

14. The chromatic converter for altimetry of claim 13, wherein said N incident beams are also filtered by said filtering holes to be converted into spatially uniform beams, before arriving at the surface of said sample.

15. The chromatic converter for altimetry of claim 1, wherein said polychromatic light source lights said mask sequentially.

16. The chromatic converter for altimetry of claim 1, further comprising a light-splitting device, intended to split the light fluxes of said N incident beams and of said N reflected beams, to allow almost all of the light flux of said N incident beams to propagate toward said surface of the sample and almost all of the light flux of said N reflected beams to propagate toward an analysis device comprising a camera, said analysis device being arranged to convert a wavelength into a local height of the corresponding object point of the surface of the sample.

17. The chromatic converter for altimetry of claim 16, wherein said camera is a trichromatic camera or a complementary color camera.

18. The chromatic converter for altimetry of claim 16, wherein a second Offner autocollimator of which one of the two mirrors is a Mangin mirror is arranged upstream of said device intended to introduce axial chromatism, to correct the chromatic defects generated by said light-splitting device.

19. An assembly comprising a chromatic converter for altimetry according to claim 1 and a telecentric, preferably bi-telecentric, lens on which said chromatic converter is mounted.

20. A method for producing a real image of a predefined observation zone of the surface of a sample representative of the local height of this sample, by the implementation of a chromatic converter for altimetry, comprising the steps consisting in:

applying a device for illuminating the sample comprising at least one polychromatic light source, said illumination device being applied in such a way as to cover, at each instant, all of said predefined observation zone, dividing said polychromatic light by simultaneously generating, using a mask, N incident beams from said polychromatic light, each incident beam defining one of said object points, said mask being arranged to block a portion of said polychromatic light to allow only said N incident beams to pass, said incident beams being distributed substantially throughout the extent of said observation zone, introducing axial chromatism into each of said N incident beams, according to a given range of wavelengths, before said N incident beams arrive at the sample surface to be reflected as N respective reflected beams by said corresponding object points, filtering said N reflected beams to convert them into filtered beams of low spectral width, intended to form image spots constituting said real image, polarizing said N incident beams and said N reflected beams, wherein the step consisting in introducing axial chromatism into said N incident beams is implemented by the interposition of an Offner autocollimator comprising at least one Mangin mirror on the path of said N incident beams.

* * * * *

UNITED STATES PATENT AND TRADEMARK OFFICE
CERTIFICATE OF CORRECTION

PATENT NO.       : 9,261,352 B2
APPLICATION NO.  : 14/402602
DATED            : February 16, 2016
INVENTOR(S)      : Jean-Michel Burry et al.

Page 1 of 1

It is certified that error appears in the above-identified patent and that said Letters Patent is hereby corrected as shown below:

In the claims

Column 9, Line 45, Claim 1, delete "device," and insert -- device --

Column 9, Line 59, Claim 2, after "altimetry" delete "as claimed"

Column 10, Line 15, Claim 5, before "said" delete "the"

Column 10, Line 23, Claim 6, after "altimetry" insert -- of --

Signed and Sealed this
Thirty-first Day of May, 2016

Michelle K. Lee
*Director of the United States Patent and Trademark Office*